(12) United States Patent
Fu et al.

(10) Patent No.: US 12,341,716 B2
(45) Date of Patent: Jun. 24, 2025

(54) METHOD AND DEVICE FOR RECEIVING DOWNLINK CONTROL INFORMATION DCI

(71) Applicant: Samsung Electronics Co., Ltd., Gyeonggi-do (KR)

(72) Inventors: Jingxing Fu, Beijing (CN); Sa Zhang, Beijing (CN); Feifei Sun, Beijing (CN); Yi Wang, Beijing (CN)

(73) Assignee: Samsung Electronics Co., Ltd (KR)

( * ) Notice: Subject to any disclaimer, the term of this patent is extended or adjusted under 35 U.S.C. 154(b) by 487 days.

(21) Appl. No.: 17/738,522

(22) Filed: May 6, 2022

(65) Prior Publication Data
US 2022/0360385 A1    Nov. 10, 2022

(30) Foreign Application Priority Data

May 8, 2021    (CN) .......................... 202110501437.3
Aug. 25, 2021    (CN) .......................... 202110983152.8

(51) Int. Cl.
*H04L 5/00* (2006.01)
*H04L 1/1812* (2023.01)
*H04W 72/0453* (2023.01)
*H04W 72/23* (2023.01)

(52) U.S. Cl.
CPC .......... *H04L 5/0044* (2013.01); *H04L 1/1812* (2013.01); *H04L 5/0053* (2013.01); *H04W 72/0453* (2013.01); *H04W 72/23* (2023.01)

(58) Field of Classification Search
None
See application file for complete search history.

(56) References Cited

U.S. PATENT DOCUMENTS

| 2015/0319718 | A1* | 11/2015 | Yang | ..................... H04W 76/15 370/252 |
| 2015/0334762 | A1* | 11/2015 | Yang | ..................... H04W 72/20 370/329 |
| 2020/0187170 | A1* | 6/2020 | Shin | ....................... H04W 28/06 |
| 2020/0267511 | A1* | 8/2020 | Abdoli | ................. H04W 76/11 |
| 2020/0267670 | A1* | 8/2020 | Åström | ................. H04W 48/10 |
| 2020/0328840 | A1* | 10/2020 | Salah | .................... H04W 24/08 |
| 2020/0389874 | A1* | 12/2020 | Lin | ........................ H04W 72/23 |

(Continued)

FOREIGN PATENT DOCUMENTS

| WO | WO 2020/222574 | 11/2020 |
| WO | WO 2021/066199 | 4/2021 |

OTHER PUBLICATIONS

CMCC, "Discussion on Group Scheduling Mechanisms", R1-2102900, 3GPP TSG RAN WG1 #104b-e, Apr. 12-20, 2021, 13 pages.

(Continued)

*Primary Examiner* — Faiyazkhan Ghafoerkhan
(74) *Attorney, Agent, or Firm* — The Farrell Law Firm, P.C.

(57) ABSTRACT

The present disclosure provides a method performed by a user equipment (UE), the method including determining formats of all downlink control information (DCI) to be received and DCI format payload sizes corresponding to the formats of the DCI; performing an alignment operation on one or more of the DCI format payload sizes according to a protocol or higher-layer signaling; and receiving all DCI, wherein, the formats of all DCI to be received include a DCI format for a multicast physical downlink shared channel (PDSCH).

20 Claims, 10 Drawing Sheets

(56) References Cited

U.S. PATENT DOCUMENTS

2021/0227517 A1* 7/2021 Yi .................. H04W 72/23
2022/0167320 A1* 5/2022 Lee ................. H04L 1/1671
2022/0360385 A1* 11/2022 Fu .................. H04L 5/0091

OTHER PUBLICATIONS

ZTE, "Discussion on Mechanisms to Support Group Scheduling for RRC_Connected UEs", R1-2102501, 3GPP TSG RAN WG1 #104b-e, Apr. 12-20, 2021, 11 pages.
International Search Report dated Aug. 19, 2022 issued in counterpart application No. PCT/KR2022/006481, 7 pages.

* cited by examiner

METHOD AND DEVICE FOR RECEIVING DOWNLINK CONTROL INFORMATION DCI

CROSS-REFERENCE TO RELATED APPLICATION(S)

This application is based on and claims priority under 35 U.S.C. § 119(a) to Chinese Patent Application Number 202110501437.3, filed on May 8, 2021, in the China National Intellectual Property Administration, and Chinese Patent Application Number 202110983152.8, filed on Aug. 25, 2021, in the China National Intellectual Property Administration, the entire disclosure of each of which is incorporated herein by reference.

BACKGROUND

1. Field

The present disclosure relates generally to the technical field of wireless communication, more specifically, to a method and device for receiving downlink control information (DCI).

2. Description of Related Art

Fifth generation (5G) mobile communication technologies define broad frequency bands such that high transmission rates and new services are possible, and can be implemented not only in "Sub 6 GHz" bands such as 3.5 GHz, but also in "Above 6 GHz" bands referred to as mmWave including 28 GHz and 39 GHz. In addition, it has been considered to implement sixth generation (6G) mobile communication technologies (referred to as Beyond 5G systems) in terahertz bands (for example, 95 GHz to 3 THz bands) in order to accomplish transmission rates fifty times faster than 5G mobile communication technologies and ultra-low latencies one-tenth of 5G mobile communication technologies.

At the beginning of the development of 5G mobile communication technologies, in order to support services and to satisfy performance requirements in connection with enhanced Mobile BroadBand (eMBB), Ultra Reliable Low Latency Communications (URLLC), and massive Machine-Type Communications (mMTC), there has been ongoing standardization regarding beamforming and massive Multiple-Input Multiple-Output (MIMO) for mitigating radio-wave path loss and increasing radio-wave transmission distances in mmWave, supporting numerologies (for example, operating multiple subcarrier spacings) for efficiently utilizing mmWave resources and dynamic operation of slot formats, initial access technologies for supporting multi-beam transmission and broadbands, definition and operation of Bandwidth Part (BWP), new channel coding methods such as a Low Density Parity Check (LDPC) code for large amount of data transmission and a polar code for highly reliable transmission of control information, L2 pre-processing, and network slicing for providing a dedicated network specialized to a specific service.

Currently, there are ongoing discussions regarding improvement and performance enhancement of initial 5G mobile communication technologies in view of services to be supported by 5G mobile communication technologies, and there has been physical layer standardization regarding technologies such as Vehicle-to-everything (V2X) for aiding driving determination by autonomous vehicles based on information regarding positions and states of vehicles transmitted by the vehicles and for enhancing user convenience, New Radio Unlicensed (NR-U) aimed at system operations conforming to various regulation-related requirements in unlicensed bands, NR UE Power Saving, Non-Terrestrial Network (NTN) which is UE-satellite direct communication for providing coverage in an area in which communication with terrestrial networks is unavailable, and positioning.

Moreover, there has been ongoing standardization in air interface architecture/protocol regarding technologies such as Industrial Internet of Things (IIoT) for supporting new services through interworking and convergence with other industries, Integrated Access and Backhaul (IAB) for providing a node for network service area expansion by supporting a wireless backhaul link and an access link in an integrated manner, mobility enhancement including conditional handover and Dual Active Protocol Stack (DAPS) handover, and two-step random access for simplifying random access procedures (2-step random-access channel (RACH) for NR). There also has been ongoing standardization in system architecture/service regarding a 5G baseline architecture (for example, service based architecture or service based interface) for combining Network Functions Virtualization (NFV) and Software-Defined Networking (SDN) technologies, and Mobile Edge Computing (MEC) for receiving services based on UE positions.

As 5G mobile communication systems are commercialized, connected devices that have been exponentially increasing will be connected to communication networks, and it is accordingly expected that enhanced functions and performances of 5G mobile communication systems and integrated operations of connected devices will be necessary. To this end, new research is scheduled in connection with eXtended Reality (XR) for efficiently supporting Augmented Reality (AR), Virtual Reality (VR), Mixed Reality (MR) and the like, 5G performance improvement and complexity reduction by utilizing Artificial Intelligence (AI) and Machine Learning (ML), AI service support, metaverse service support, and drone communication.

Furthermore, such development of 5G mobile communication systems will serve as a basis for developing not only new waveforms for providing coverage in terahertz bands of 6G mobile communication technologies, multi-antenna transmission technologies such as Full Dimensional MIMO (FD-MIMO), array antennas and large-scale antennas, meta-material-based lenses and antennas for improving coverage of terahertz band signals, high-dimensional space multiplexing technology using Orbital Angular Momentum (OAM), and Reconfigurable Intelligent Surface (RIS), but also full-duplex technology for increasing frequency efficiency of 6G mobile communication technologies and improving system networks, AI-based communication technology for implementing system optimization by utilizing satellites and Artificial Intelligence (AI) from the design stage and internalizing end-to-end AI support functions, and next-generation distributed computing technology for implementing services at levels of complexity exceeding the limit of UE operation capability by utilizing ultra-high-performance communication and computing resources.

The above information is presented as background information only to assist with an understanding of the disclosure. No determination has been made, and no assertion is made, as to whether any of the above might be applicable as prior art with regard to the disclosure.

For 5G, as well as other wireless communication systems, it would be advantageous to transmit and receive DCI for multicast.

SUMMARY

The present disclosure has been made to address the above-mentioned problems and disadvantages, and to provide at least the advantages described below.

According to an aspect of the present disclosure, a method performed by a UE is provided. The method includes determining formats of all DCI to be received and DCI format payload sizes corresponding to the formats of the DCI; performing an alignment operation on one or more of the DCI format payload sizes according to a protocol or higher-layer signaling; and receiving all DCI, wherein, the formats of all DCI to be received include a DCI format for a multicast PDSCH.

According to another aspect of the present disclosure, a UE is provided, which includes a transceiver; and a processor configured to determine formats of all DCI to be received and DCI format payload sizes corresponding to the formats of the DCI; perform an alignment operation on one or more of the DCI format payload sizes according to a protocol or higher-layer signaling; and receive all the DCI, wherein, the formats of all the DCI to be received include a DCI format for a multicast PDSCH.

According to another aspect of the present disclosure, a method performed by a base station is provided. The method includes selectively transmitting a higher-layer signaling configuration to a UE, wherein the higher-layer signaling configuration indicates formats of all DCI to be received by the UE and DCI format payload sizes corresponding to the formats of the DCI; performing an alignment operation on one or more of the DCI format payload sizes; and transmitting all the DCI, wherein, the formats of all the DCI to be received include a DCI format for a multicast PDSCH.

According to another aspect of the present disclosure, a base station is provided. The base station includes a transceiver; and a processor configured to selectively transmit a higher-layer signaling configuration to a UE, wherein the higher-layer signaling configuration indicates formats of all DCI to be received by the UE and DCI format payload sizes corresponding to the formats of the DCI; perform an alignment operation on one or more of the DCI format payload sizes; and transmit all the DCI, wherein, the formats of all the DCI to be received include a DCI format for a multicast PDSCH.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
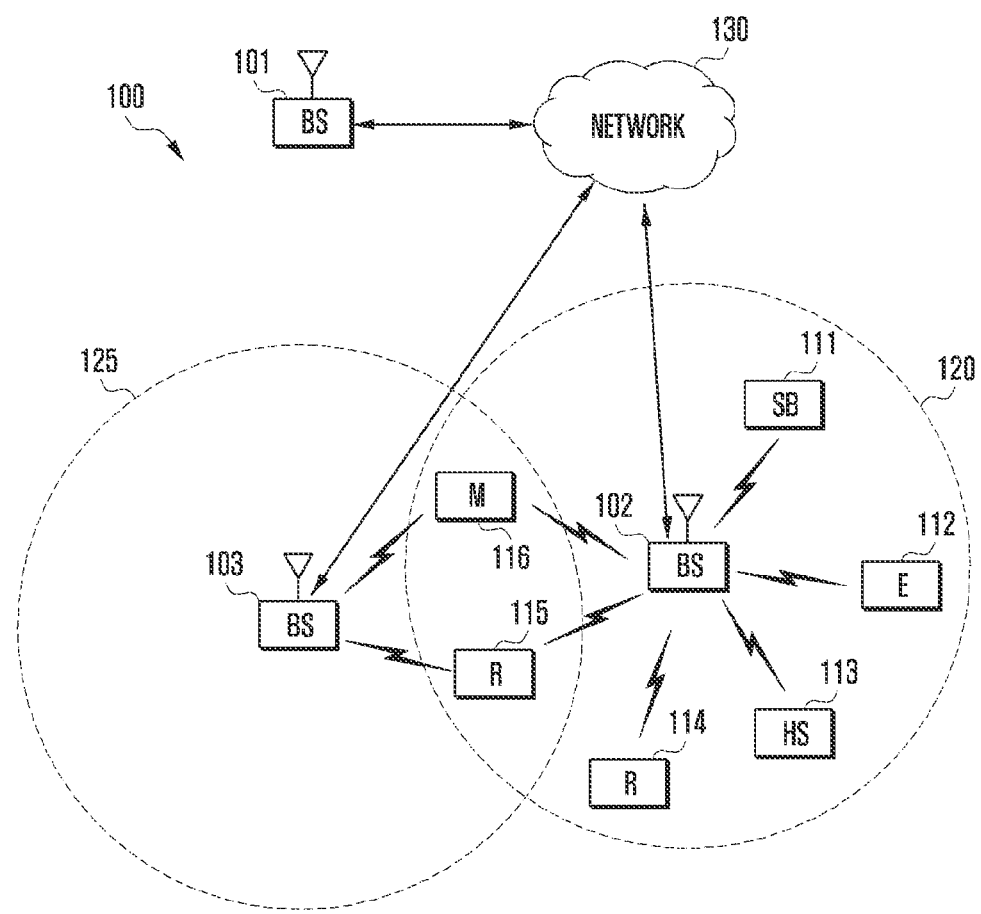
FIG. 1 illustrates a wireless network, according to an embodiment of the disclosure.

Various embodiments of the present disclosure are described with reference to the accompanying drawings. However, various embodiments of the present disclosure are not limited to particular embodiments, and it should be understood that modifications, equivalents, and/or alternatives of the embodiments described herein can be variously made. With regard to description of drawings, similar components may be marked by similar reference numerals.

When describing embodiments of the present disclosure, descriptions related to technical contents known in the art and not directly related to the present disclosure may be omitted to convey the details of the disclosure more clearly.

Some elements may be enlarged, omitted or schematically shown in the drawings. In addition, the size of each component may not fully reflect the actual size. In the drawings, identical or corresponding elements may have the same reference numerals.

In the disclosure, a transmission from a base station to a UE is called downlink, and a transmission from a UE to a base station is called uplink.

Provided herein is a method capable of receiving DCI for multicast.

The present disclosure provides a method and device for receiving DCI, which can reduce the complexity of receiving DCI.

A newly introduced DCI format will be described by taking DCI format 1-3 and DCI format 1-4 as examples, and the specific names of the introduced new DCI formats are not limited herein. For example, the DCI format 1-3 can be called the first DCI format and the DCI format 1-4 can be called the second DCI format.

By aligning one or more DCI format payload sizes including a DCI format for multicast, the complexity of demodulation and decoding performed by a UE may be reduced.

FIG. 1 illustrates a wireless network, according to an embodiment of the disclosure. The embodiment of the wireless network 100 shown in FIG. 1 is for illustration only. Other embodiments of the wireless network 100 can be used without departing from the scope of the present disclosure.

Referring to FIG. 1, the wireless network 100 includes a gNodeB (gNB) 101, a gNB 102, and a gNB 103. gNB 101 communicates with gNB 102 and gNB 103. gNB 101 also communicates with at least one Internet protocol (IP) network 130, such as the Internet, a private IP network, or other data networks.

Depending on a type of the network, other well-known terms such as "base station" or "access point" can be used instead of "gNodeB" or "gNB". For convenience, the terms "gNodeB" and "gNB" are used to refer to network infrastructure components that provide wireless access for remote terminals. And, depending on the type of the network, other well-known terms such as "mobile station", "user station", "remote terminal", "wireless terminal" or "user apparatus" can be used instead of "user equipment" or "UE". For convenience, the terms "user equipment" and "UE" are used to refer to remote wireless devices that wirelessly access the gNB, no matter whether the UE is a mobile device (such as a mobile phone or a smart phone) or a fixed device (such as a desktop computer or a vending machine).

gNB 102 provides wireless broadband access to the network 130 for a first group of UEs (e.g., one or more UEs) within a coverage area 120 of gNB 102. The first group of UEs include a UE 111, which may be located in a small business (SB); a UE 112, which may be located in an enterprise (E); a UE 113, which may be located in a wireless fidelity (Wi-Fi) hotspot (HS); a UE 114, which may be located in a first residence (R); a UE 115, which may be located in a second residence (R); a UE 116, which may be a mobile device (M), such as a cellular phone, a wireless laptop computer, or a wireless personal digital assistant (PDA). gNB 103 provides wireless broadband access to network 130 for a second group of UEs within a coverage area 125 of gNB 103. The second group of UEs include the UE 115 and the UE 116. In some embodiments, one or more of gNBs 101-103 can communicate with each other and with UEs 111-116 using 5G, long term evolution (LTE), LTE-advanced (LTE-A), worldwide interoperability for microwave access (WiMAX) or other advanced wireless communication technologies.

The dashed lines show approximate ranges of the coverage areas 120 and 125, and the ranges are shown as approximate circles merely for illustration and explanation purposes. It should be clearly understood that the coverage areas associated with the gNBs, such as the coverage areas 120 and 125, may have other shapes, including irregular shapes, depending on configurations of the gNBs and changes in the radio environment associated with natural obstacles and man-made obstacles.

As will be described in more detail below, one or more of gNB 101, gNB 102, and gNB 103 include a two-dimensional (2D) antenna array as described in embodiments of the present disclosure. In some embodiments, one or more of gNB 101, gNB 102, and gNB 103 support codebook designs and structures for systems with 2D antenna arrays.

Various changes can be made to FIG. 1. The wireless network 100 can include any number of gNBs and any number of UEs in any suitable arrangement, for example. Furthermore, gNB 101 can directly communicate with any number of UEs and provide wireless broadband access to the network 130 for those UEs. Similarly, each gNB 102-103 can directly communicate with the network 130 and provide direct wireless broadband access to the network 130 for the UEs. In addition, gNB 101, 102 and/or 103 can provide access to other or additional external networks, such as external telephone networks or other types of data networks.

Figure 2A:
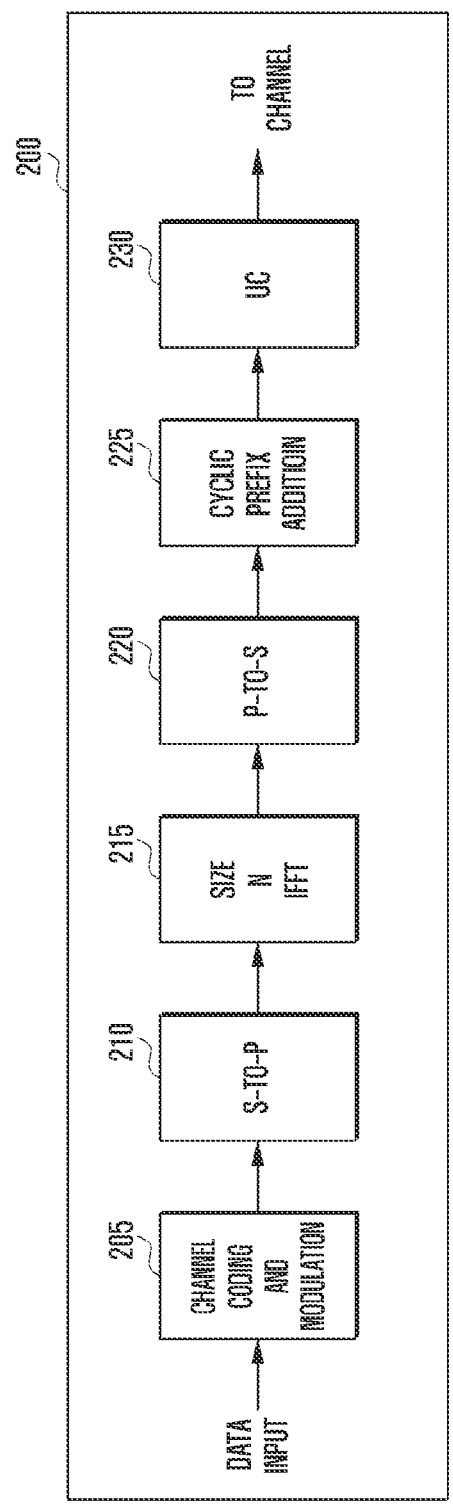
FIG. 2A illustrates a wireless transmission and reception path, according to an embodiment of the disclosure.
Figure 2B:
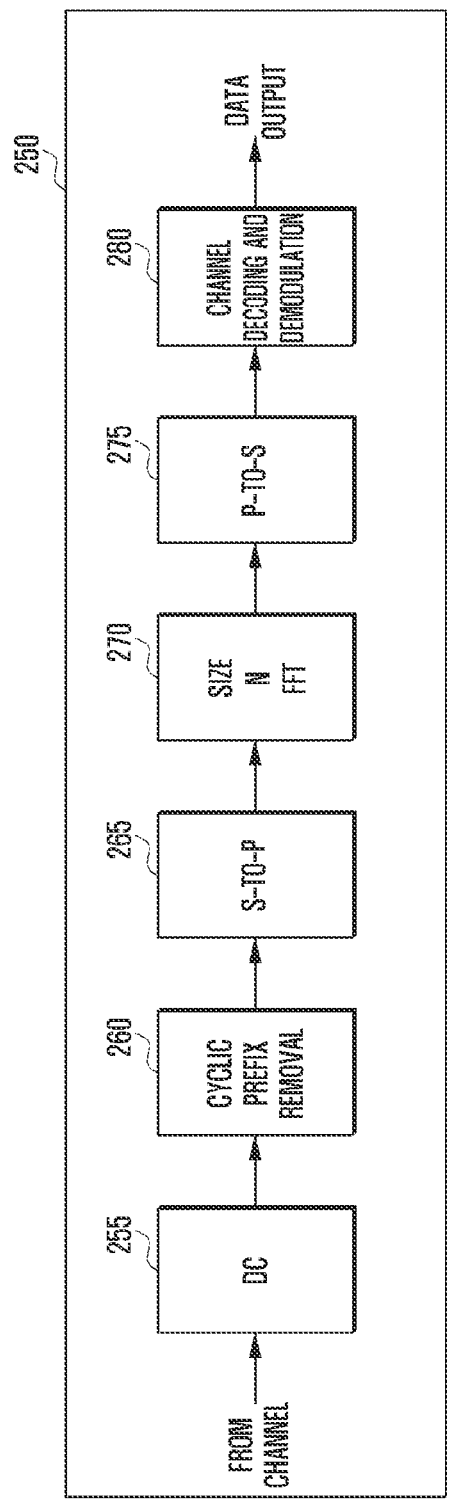
FIG. 2B illustrates a wireless transmission and reception path, according to an embodiment of the disclosure.

FIGS. 2A-2B illustrate wireless transmission and reception paths, according to various embodiments of the disclosure. In the following description, the transmission path 200 can be described as being implemented in a gNB, such as gNB 102, and the reception path 250 can be described as being implemented in a UE, such as UE 116. However, it should be understood that the reception path 250 can be implemented in a gNB and the transmission path 200 can be implemented in a UE. In some embodiments, the reception path 250 is configured to support codebook designs and structures for systems with 2D antenna arrays.

Referring to FIGS. 2A-2B, the transmission path 200 includes a channel coding and modulation block 205, a serial-to-parallel (S-to-P) block 210, a size N inverse fast Fourier transform (IFFT) block 215, a parallel-to-serial (P-to-S) block 220, a cyclic prefix addition block 225, and an up-converter (UC) 230. The reception path 250 includes a down-converter (DC) 255, a cyclic prefix removal block 260, a serial-to-parallel (S-to-P) block 265, a size N fast Fourier transform (FFT) block 270, a parallel-to-serial (P-to-S) block 275, and a channel decoding and demodulation block 280.

In the transmission path 200, the channel coding and modulation block 205 receives a set of information bits, applies coding (such as low density parity check (LDPC) coding), and modulates the input bits (such as using quadrature phase shift keying (QPSK) or quadrature amplitude modulation (QAM)) to generate a sequence of frequency-domain modulated symbols. The S-to-P block 210 converts (such as demultiplexes) serial modulated symbols into parallel data to generate N parallel symbol streams, where N is a size of the IFFT/FFT used in the gNB 102 and UE 116. The size N IFFT block 215 performs IFFT operations on the N parallel symbol streams to generate a time-domain output signal. The P-to-S block 220 converts (such as multiplexes) parallel time-domain output symbols from the size N IFFT block 215 to generate a serial time-domain signal. The cyclic prefix addition block 225 inserts a cyclic prefix into the time-domain signal. The up-converter 230 modulates (such as up-converts) the output of the cyclic prefix addition block 225 to an RF frequency for transmission via a wireless channel. The signal can also be filtered at a baseband before switching to the RF frequency.

The RF signal transmitted from gNB 102 arrives at UE 116 after passing through the wireless channel, and operations in reverse to those at gNB 102 are performed at UE 116. The down-converter 255 down-converts the received signal to a baseband frequency, and the cyclic prefix removal block 260 removes the cyclic prefix to generate a serial time-domain baseband signal. The S-to-P block 265 converts the time-domain baseband signal into a parallel time-domain signal. The size N FFT block 270 performs an FFT algorithm to generate N parallel frequency-domain signals. The P-to-S block 275 converts the parallel frequency-domain signal into a sequence of modulated data symbols. The channel decoding and demodulation block 280 demodulates and decodes the modulated symbols to recover the original input data stream.

Each of gNBs 101-103 may implement a transmission path 200 similar to that for transmitting to UEs 111-116 in the downlink, and may implement a reception path 250 similar to that for receiving from UEs 111-116 in the uplink. Similarly, each of UEs 111-116 may implement a transmission path 200 for transmitting to gNBs 101-103 in the uplink, and may implement a reception path 250 for receiving from gNBs 101-103 in the downlink.

Each of the components in FIGS. 2A and 2B can be implemented using only hardware, or using a combination of hardware and software/firmware. At least some of the components in FIGS. 2A and 2B may be implemented in software, while other components may be implemented in configurable hardware or a combination of software and configurable hardware. For example, the FFT block 270 and IFFT block 215 may be implemented as configurable software algorithms, in which the value of the size N may be modified according to the implementation.

Furthermore, although FFT and IFFT have been described, other types of transforms can be used, such as discrete Fourier transform (DFT) and inverse discrete Fourier Transform (IDFT) functions. It should be understood that for DFT and IDFT functions, the value of variable N may be any integer (such as 1, 2, 3, 4, etc.), while for FFT and IFFT functions, the value of variable N may be any integer which is a power of 2 (such as 1, 2, 4, 8, 16, etc.).

Although FIGS. 2A and 2B illustrate examples of wireless transmission and reception paths, various changes may be made. For example, various components in FIGS. 2A and 2B can be combined, further subdivided or omitted, and additional components can be added according to specific requirements. Furthermore, FIGS. 2A and 2B are intended to illustrate examples of types of transmission and reception paths that can be used in a wireless network. Any other suitable architecture can be used to support wireless communication in a wireless network.

Figure 3A:
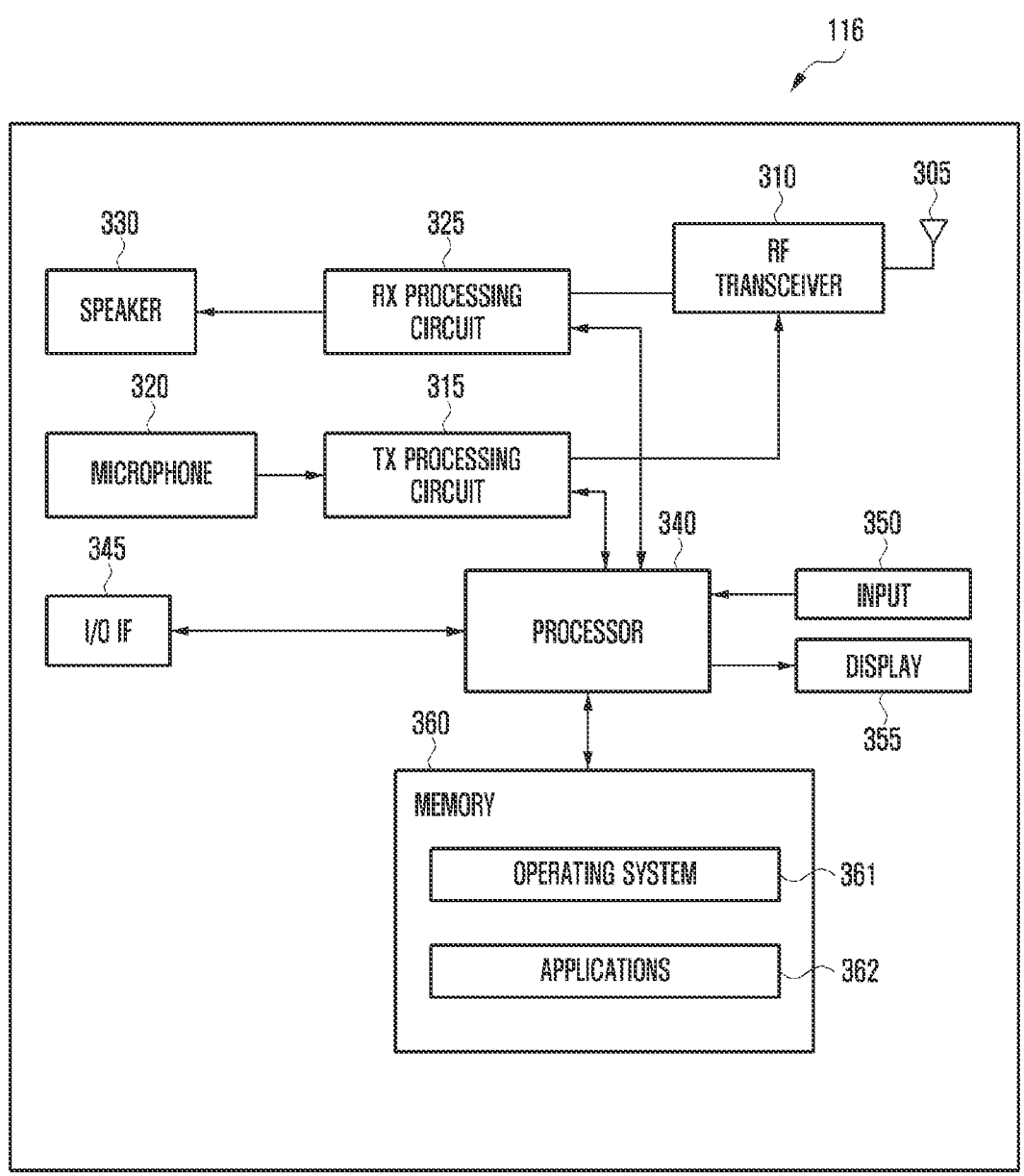
FIG. 3A illustrates a UE, according to an embodiment of the disclosure.

FIG. 3A illustrates a UE, according to an embodiment of the disclosure. The embodiment of UE 116 shown in FIG. 3A is for illustration only, and UEs 111-115 of FIG. 1 can have the same or similar configurations. FIG. 3A does not limit the scope of the present disclosure to any specific implementation of the UE.

Referring to FIG. 3A, UE 116 includes an antenna 305, a radio frequency (RF) transceiver 310, a transmission (TX) processing circuit 315, a microphone 320, and a reception (RX) processing circuit 325. UE 116 also includes a speaker 330, a processor/controller 340, an input/output (I/O) interface 345, an input device(s) 350, a display 355, and a memory 360. The memory 360 includes an operating system (OS) 361 and one or more applications 362.

The RF transceiver 310 receives an incoming RF signal transmitted by a gNB of the wireless network 100 from the antenna 305. The RF transceiver 310 down-converts the incoming RF signal to generate an intermediate frequency (IF) or baseband signal. The IF or baseband signal is transmitted to the RX processing circuit 325, where the RX processing circuit 325 generates a processed baseband signal by filtering, decoding and/or digitizing the baseband or IF signal. The RX processing circuit 325 transmits the processed baseband signal to the speaker 330 (such as for voice data) or to the processor/controller 340 for further processing (such as for web browsing data).

The TX processing circuit 315 receives analog or digital voice data from microphone 320 or other outgoing baseband data (such as network data, email or interactive video game data) from processor/controller 340. The TX processing circuit 315 encodes, multiplexes, and/or digitizes the outgoing baseband data to generate a processed baseband or IF signal. The RF transceiver 310 receives the outgoing processed baseband or IF signal from the TX processing circuit 315 and up-converts the baseband or IF signal into an RF signal transmitted via the antenna 305.

The processor/controller 340 can include one or more processors or other processing devices and execute an OS 361 stored in the memory 360 in order to control the overall operation of UE 116. For example, the processor/controller 340 can control the reception of forward channel signals and the transmission of backward channel signals through the RF transceiver 310, the RX processing circuit 325 and the TX processing circuit 315 according to well-known principles. In some embodiments, the processor/controller 340 includes at least one microprocessor or microcontroller.

The processor/controller 340 is also capable of executing other processes and programs residing in the memory 360, such as operations for channel quality measurement and reporting for systems with 2D antenna arrays as described in embodiments of the present disclosure. The processor/controller 340 can move data into or out of the memory 360 as required by an execution process. In some embodiments, the processor/controller 340 is configured to execute the application 362 based on the OS 361 or in response to signals received from the gNB or the operator. The processor/controller 340 is also coupled to an I/O interface 345, where the I/O interface 345 provides UE 116 with the ability to connect to other devices such as laptop computers and handheld computers. I/O interface 345 is a communication path between these devices and the processor/controller 340.

The processor/controller 340 is also coupled to the input device(s) 350 and the display 355. An operator of UE 116 can input data into UE 116 using the input device(s) 350. The display 355 may be a liquid crystal display or other display capable of presenting text and/or at least limited graphics (such as from a website). The memory 360 is coupled to the processor/controller 340. A part of the memory 360 can include a random access memory (RAM), while another part of the memory 360 can include a flash memory or other read-only memory (ROM).

Although FIG. 3A illustrates an example of UE 116, various changes can be made to FIG. 3A. Various components in FIG. 3A can be combined, further subdivided or omitted, and additional components can be added according to specific requirements. For example, the processor/controller 340 can be divided into a plurality of processors, such as one or more central processing units (CPUs) and one or more graphics processing units (GPUs). Furthermore, although FIG. 3A illustrates that the UE 116 is configured as a mobile phone or a smart phone, UEs can be configured to operate as other types of mobile or fixed devices.

Figure 3B:
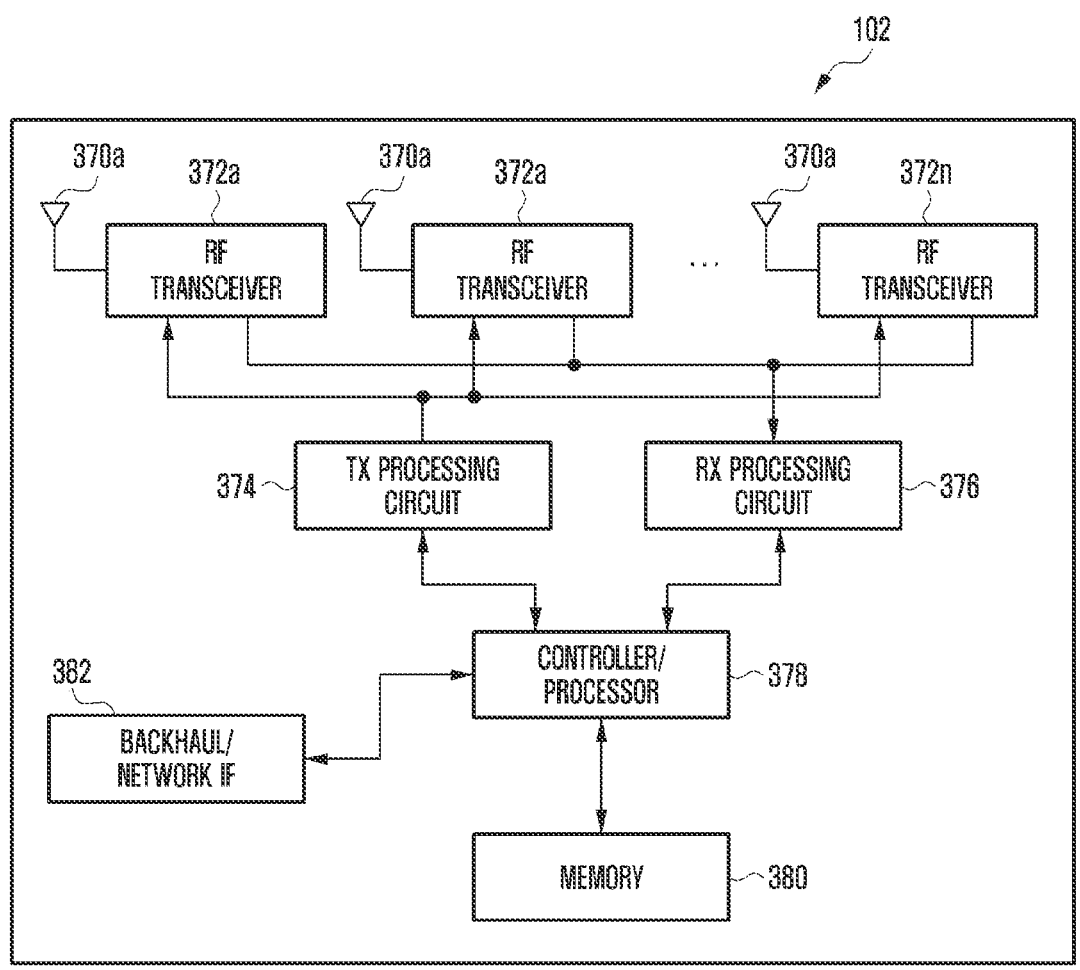
FIG. 3B illustrates a base station (e.g., a gNB), according to an embodiment of the disclosure.

FIG. 3B illustrates a base station (e.g., a gNB), according to an embodiment of the disclosure. The embodiment of gNB 102 shown in FIG. 3B is for illustration only, and other gNBs of FIG. 1 can have the same or similar configurations. However, a gNB has various configurations, and FIG. 3B does not limit the scope of the present disclosure to any specific implementation of a gNB. gNB 101 and gNB 103 can include the same or similar structures as gNB 102.

Referring to FIG. 3B, gNB 102 includes a plurality of antennas 370a-370n, a plurality of RF transceivers 372a-372n, a transmission (TX) processing circuit 374, and a reception (RX) processing circuit 376. In certain embodiments, one or more of the plurality of antennas 370a-370n include a 2D antenna array. gNB 102 also includes a controller/processor 378, a memory 380, and a backhaul or network interface 382.

RF transceivers 372a-372n receive an incoming RF signal from antennas 370a-370n, such as a signal transmitted by UEs or other gNBs. RF transceivers 372a-372n down-convert the incoming RF signal to generate an IF or baseband signal. The IF or baseband signal is transmitted to the RX processing circuit 376, where the RX processing circuit 376 generates a processed baseband signal by filtering, decoding and/or digitizing the baseband or IF signal. RX processing circuit 376 transmits the processed baseband signal to controller/processor 378 for further processing.

The TX processing circuit 374 receives analog or digital data (such as voice data, network data, and/or email or interactive video game data) from the controller/processor 378. TX processing circuit 374 encodes, multiplexes and/or digitizes outgoing baseband data to generate a processed baseband or IF signal. RF transceivers 372a-372n receive the outgoing processed baseband or IF signal from TX processing circuit 374 and up-convert the baseband or IF signal into an RF signal transmitted via antennas 370a-370n.

The controller/processor 378 can include one or more processors or other processing devices that control the overall operation of gNB 102. For example, the controller/processor 378 can control the reception of forward channel signals and the transmission of backward channel signals through the RF transceivers 372a-372n, the RX processing circuit 376 and the TX processing circuit 374 according to well-known principles. The controller/processor 378 can also support additional functions, such as higher-level wireless communication functions. For example, the controller/processor 378 can perform a blind interference sensing (BIS) process such as that performed through a BIS algorithm, and decode a received signal from which an interference signal is subtracted. A controller/processor 378 may support any of a variety of other functions in gNB 102. In some embodiments, the controller/processor 378 includes at least one microprocessor or microcontroller.

The controller/processor 378 is also capable of executing programs and other processes residing in the memory 380, such as a basic OS. The controller/processor 378 can also support channel quality measurement and reporting for systems with 2D antenna arrays. In some embodiments, the controller/processor 378 supports communication between entities such as web real time communications (RTCs). The controller/processor 378 can move data into or out of the memory 380 as required by an execution process.

The controller/processor 378 is also coupled to the backhaul or network interface 382. The backhaul or network interface 382 allows gNB 102 to communicate with other devices or systems through a backhaul connection or through a network. The backhaul or network interface 382 can support communication over any suitable wired or wireless connection(s). For example, when gNB 102 is implemented as a part of a cellular communication system, such as a cellular communication system supporting 5G or new radio (NR) access technology, LTE or LTE-A, the backhaul or network interface 382 can allow gNB 102 to communicate with other gNBs through wired or wireless backhaul connections. When gNB 102 is implemented as an access point, the backhaul or network interface 382 can allow gNB 102 to communicate with a larger network, such as the Internet, through a wired or wireless local area network or through a wired or wireless connection. The backhaul or network interface 382 includes any suitable structure that supports communication through a wired or wireless connection, such as an Ethernet or an RF transceiver.

The memory 380 is coupled to the controller/processor 378. A part of the memory 380 can include a RAM, while another part of the memory 380 can include a flash memory or other ROMs. In certain embodiments, a plurality of instructions, such as the BIS algorithm, are stored in the memory. The plurality of instructions are configured to cause the controller/processor 378 to execute the BIS process and decode the received signal after subtracting at least one interference signal determined by the BIS algorithm.

As will be described in more detail below, the transmission and reception paths of gNB 102 (implemented using RF transceivers 372a-372n, TX processing circuit 374 and/or RX processing circuit 376) support aggregated communication with frequency division duplex (FDD) cells and time division duplex (TDD) cells.

Although FIG. 3B illustrates an example of gNB 102, various changes may be made to FIG. 3B. For example, gNB 102 can include one or more each component shown in FIG. 3A. For example, the access point can include many backhaul or network interfaces 382, and the controller/processor 378 can support routing functions to route data between different network addresses. In addition, gNB 102 can include multiple instances of the TX processing circuit 374 and the RX processing circuit 376 (such as one instance for each RF transceiver).

The reception of the PDSCH and the physical uplink shared channel (PUSCH) may be scheduled by DCI transmitted through a physical downlink control channel (PDCCH).

PDSCH may include unicast PDSCH and multicast PDSCH, unicast PDSCH is one PDSCH received by one UE, and multicast (groupcast)/broadcast is one PDSCH received by multiple UEs simultaneously.

Search space for transmitting DCI may include a common search space (CSS) and UE-specific search space (USS), in which any UE can demodulate and decode for CSS, but only a specific UE can demodulate and decode for USS.

The formats of DCI can be divided into the DCI formats for scheduling a PDSCH (for example, DCI format 1-0, DC format 1-1, and DCI format 1-2) and the DCI formats for scheduling a PUSCH (for example, DCI format 0-0, DCI format 0-1, and DCI format 0-2). The formats of DCI can also be divided into fallback DCI formats (for example, DCI format 0-0 and DCI format 1-0) and non-fallback DCI formats (for example, DCI format 0-1, DCI format 1-1, DCI format 0-2 and DCI format 1-2). DCI formats also include DCI formats not scheduling a PDSCH and a PUSCH, such as DCI formats for transmitting power control commands (e.g., DCI formats 2-2 and 2-3). The number of information bits contained (e.g., configured or required) in DCI of different formats may be the same or different, and the number of bits contained (e.g., configured or required) in DC of a specific DCI format may be simply referred as the number of bits of the specific DCI format. In addition, DCI for scheduling unicast and multicast can be distinguished by a cyclic redundancy check (CRC) scrambled by a different radio network temporary indicator (RNTI). For example, CRC of DCI for unicast PDSCH is scrambled by a cell radio network temporary identification value (C-RNTI), and CRC of DCI for multicast PDSCH is scrambled by a Group-common radio network temporary identification value (G-RNTI).

UEs can simultaneously receive multicast and unicast PDSCH in the same serving cell, or UEs can simultaneously receive multicast and unicast PDSCH in different serving cells. PDSCHs for transmitting different types of data can be scheduled by DCI formats with different number of bits, for example, DCI format 1-0, DCI format 1-1 and DCI format 1-2 are used to schedule unicast PDSCH, while new DCI formats 1-x, for example, DCI format 1-3 and DCI format 1-4, need to be introduced to schedule multicast PDSCH.

In order not to increase the complexity of decoding implementation of a UE, the number of different payload DCI format sizes detected by the UE in a serving cell is limited. For example, the number of different payload DCI format sizes detected by a UE in a serving cell should be less than or equal to a predetermined threshold, that is, less than or equal to M (M is a positive integer), and the number of different payload DCI format sizes scrambled with C-RNTI detected by the UE in each serving cell is less than or equal to N (N is a positive integer). That is, after the introduction of new DC formats 1-3 and 1-4, there is still a need to keep the number of different payload DCI format sizes detected by a UE in one serving cell less than or equal to M (M is a positive integer), and the number of different payload DCI format sizes scrambled by C-RNTI detected by the UE in each serving cell less than or equal to N (N is a positive integer).

Therefore, in order to solve the above-mentioned problem, the present disclosure proposes a method and device that can reduce the complexity of the process of receiving DCI, so that the types of DCI format payload sizes of different DCI formats are within the acceptable threshold of a UE, thereby reducing the complexity of demodulation and decoding of the UE and improving the resource utilization rate in the communication network.

Figure 4:
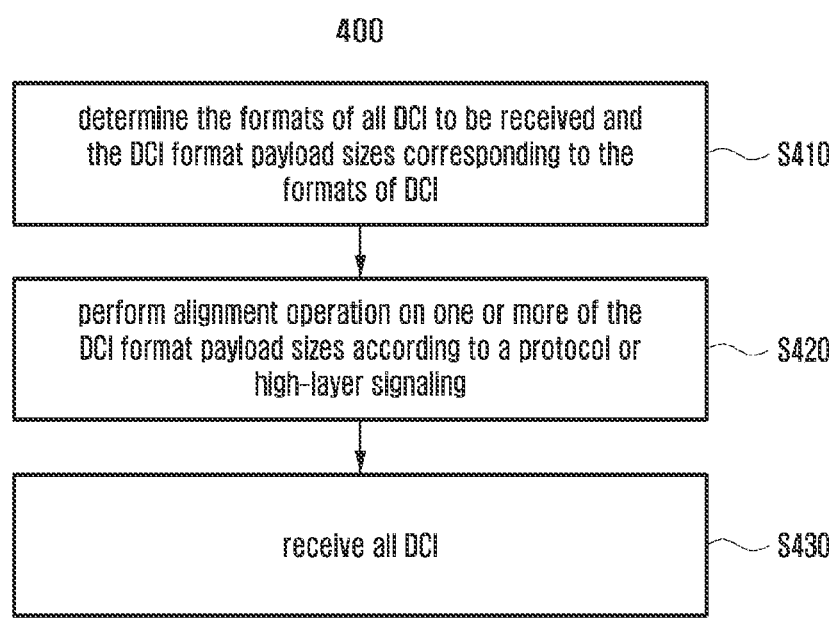
FIG. 4 illustrates a flowchart showing steps for receiving DCI, according to an embodiment of the disclosure.
Figure 5:
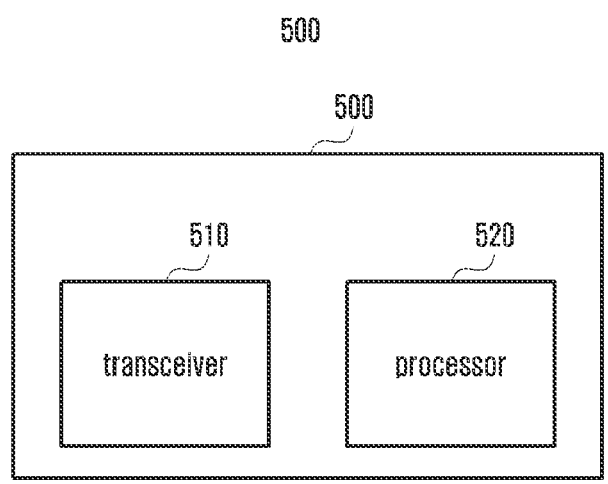
FIG. 5 illustrates a block diagram of a UE, according to an embodiment of the disclosure.

The method 400 and user equipment 500 that can reduce the complexity of receiving DCI in case that a new DCI format for multicast is introduced, will be described below with reference to FIGS. 4 and 5. Specifically, FIG. 4 illustrates a flowchart showing steps for receiving DCI, according to an embodiment of the disclosure. FIG. 5 illustrates a block diagram of a UE, according to an embodiment of the disclosure. The processor 520 shown in FIG. 5 can perform the method 400 described below in connection with FIG. 4.

As shown in FIG. 4, in step S410, a UE determines the formats of all DCI to be received and the DCI format payload sizes corresponding to the formats of DCI; in step S420, the UE performs an alignment operation on one or more of the DCI format payload sizes according to a protocol or high-layer signaling (also referred to as "higher layer signaling"); and in step S430, the UE receives all DCI.

As shown in FIG. 4, specifically, if the number of different DCI formats configured for the UE to detect exceeds a predetermined threshold, it is required to make the payload sizes of two DCI formats with a different number of bits the same by increasing or decreasing the number of bits of DCI formats, such that the number of DCI formats with different payload sizes detected by the UE does not exceed the predetermined threshold.

Without the introduction of new DCI formats 1-3 and 1-4, Alignment Methods 1 to 2 for DCI format payload size are as follows:

1. Make the payload size of DCI format 0-0 of CSS the same as that of DCI format 1-0 of CSS by increasing or decreasing the number of bits of DCI formats.

2. Make the payload size of DC format 0-0 of USS the same as that of DCI format 1-0 of USS by increasing or decreasing the number of bits of DCI formats.

If the number of DCI formats with different payloads detected by the UE in each serving cell cannot be less than or equal to 4 and the number of DCI formats with different payloads scrambled by C-RNTI detected by the UE in each serving cell is less than or equal to 3 through at least one of the above processes (1 and/or 2), then each of the following DCI format payload size Alignment Methods 3 to 5 are operated one by one numbered from small to large, until the number of DCI formats with different payloads detected by the UE in each serving cell is less than or equal to 4, and the number of DC formats with different payload scrambled by C-RNTI detected by the UE in each serving cell is less than or equal to 3.

DCI format payload size Alignment Methods 3 to 5 are as follows:

3. Make the payload size of DCI format 1-0 of USS the same as that of DCI format 1-0 of CSS by increasing or decreasing the number of bits of DCI format 1-0 of USS.

4. If the number of information bits in DCI format 0-2 before padding is less than the payload size of DCI format 1-2 for scheduling the same service cell, pad zeros in DCI format 0-2 until the payload size is equal to that of DCI format 1-2; if the number of information bits in DCI format 1-2 before padding is less than the payload size of DCI format 0-2 for scheduling the same service cell, pad zeros in DCI format 1-2 until the payload size is equal to that of DCI format 0-2.

5. If the number of information bits in DCI format 0-1 before padding is less than the payload size of DCI format 1-1 for scheduling the same service cell, pad zeros in DCI format 0-1 until the payload size is equal to that of DCI format 1-1; if the number of information bits in DCI format 1-1 before padding is less than the payload size of DCI format 0-1 for scheduling the same serving cell, pad zeros in DCI format 1-1 until the payload size is equal to that of DCI format 0-1.

After introducing new DCI formats 1-3 and 1-4, the UE determines the DCI formats 1-3 payload size according to the number of bits of each field in DCI format 1-3 (or DCI format 1-4) included in the protocol or high-layer signaling, wherein the number of bits of a frequency domain resource allocation (FDRA) field can be determined according to the common frequency resource (CFR) (the frequency domain range of group common PDSCH scheduling is contained in the resources of CFR). The advantage of this method is that the frequency domain resource allocation of multicast scheduling is more accurate.

Alternatively, the number of bits of the frequency domain resource allocation (FDRA) field can be determined according to the following method: if CORESET 0 is configured, the number of bits of FDRA is determined according to the bandwidth of CORESET 0; if CORESET 0 is not configured, the number of bits of FDRA is determined according to the initial downlink bandwidth part. The advantage of this method is that it is easier to make the payload size of DCI format for scheduling multicast the same as that of DCI format 1-0 in CSS, which reduces the difficulty of payload size alignment.

Alternatively, if the UE determines the payload size of DCI format 1-3 according to the high-layer signaling if the number of information bits of DCI format 1-3 is less than the preconfigured payload size, then zero is padded in DCI format 1-3 until the payload size is equal to the preconfigured payload size. The advantage of this method is that during the alignment of the payload size, the payload size of DCI format in USS is reduced by less than a certain threshold, which reduces the influence on DCI scheduling performance in USS.

Alternatively, the UE first receives the high-layer signaling to determine the payload size of DCI, then determines the number of bits of other fields except FDRA in DCI by receiving the high-layer signaling or according to the protocol, and then takes the difference between the payload size of DCI and the determined number of bits of other fields except FDRA as the number of bits of FDRA. For example, if the UE receives the high-layer signaling to determine that the payload size of DCI is 40 bits, and then the UE determines that other fields in DCI except FDRA are 36 bits by receiving the high-layer signaling or according to the protocol, then the number of bits of FDRA is 40−36=4 bits. The advantage of this method is that the number of bits can be used more effectively.

Alternatively, when determining the number of FDRA bits, the unit for frequency domain resource allocation is configurable, that is, the size of the allocation unit of frequency domain resources for the UE can be increased (e.g., the resource block group (RBG) can be configured), or the unit of the start resource block (RB) and the number of resource blocks can be configured. With this method, when the same frequency domain resources are scheduled, the number of bits needed to indicate the allocation of frequency domain resources will be reduced, thus it is easier to implement the alignment of payload sizes of DCI formats.

For DCI format 1-4, which is applicable to more complicated situations than that of DCI format 1-3, UE determines the DCI format 1-4 payload size according to the number of bits of each field in DCI format 1-4 included in the protocol or high-layer signaling, wherein the number of bits of frequency domain resource allocation (FDRA) field can be determined according to common frequency domain resources (CFR). The advantage of this method is that accuracy of the frequency domain resource allocation of multicast scheduling is improved.

Alternatively, the UE determines the payload size of DCI format 1-4 according to the high-layer signaling. That is, if the number of information bits of DCI format 1-4 is less than the preconfigured payload size, zeros are padded in DCI format 1-4 until the payload size is equal to the preconfigured payload size. The advantage of this method is that, during the alignment of the payload size, the payload size of DC format in USS is reduced by less than a certain threshold, which reduces the influence on DCI scheduling performance in USS.

Alignment Methods 1 to 27 which can be employed after the introduction of new DCI formats (DCI formats 1-3 and DCI formats 1-4) will be described in detail with reference to the process of receiving DCI shown in FIG. 4.

After introducing at least one of DCI format 1-3 and DCI format 1-4, with one or more of the above DCI format payload size Alignment Methods 1 to 5, stated above, the number of DC formats with different payloads detected by a UE in each serving cell may still not meet the requirements (for example, the number of DCI formats with different payloads detected by the UE in each serving cell is less than or equal to 4, and the number of DCI formats with different payload scrambled by C-RNTI detected by the UE in each serving cell is less than or equal to 3) at this time. Thus, DCI payload size alignment includes performing one or more of the following methods in a certain order until the number of DCI formats with different payloads detected by the UE in each serving cell meets the requirements. Alignment Methods 1 to 5, below, are the same as previously stated Alignment Methods 1 to 27 for DC format payload size are as follows:

1. Make the payload size of DCI format 0-0 of CSS the same as that of DCI format 1-0 of CSS by increasing or decreasing the number of bits of DCI formats.

2. Make the payload size of DCI format 0-0 of USS the same as that of DCI format 1-0 of USS by increasing or decreasing the number of bits of DCI formats.

If the number of DCI formats with different payloads detected by the UE in each serving cell cannot be less than or equal to 4 and the number of DCI formats with different payloads scrambled by C-RNTI detected by the UE in each serving cell cannot be less than or equal to 3 through the above Alignment Methods (1 and/or 2), then one or more of the following DCI format payload size alignment methods are performed in a certain order, until the number of DCI formats with different payloads detected by the UE in each serving cell is less than or equal to 4, and the number of DCI formats with different payload scrambled by C-RNTI detected by the UE in each serving cell is less than or equal to 3.

3. Make the payload size of DCI format 1-0 of USS the same as that of DCI format 1-0 of CSS by increasing or decreasing the number of bits of DCI format 1-0 of USS.

4. If the number of information bits in DCI format 0-2 before padding is less than the payload size of DCI format 1-2 for scheduling the same service cell, pad zeros in DCI format 0-2 until the payload size of DCI format 0-2 is equal to that of DCI format 1-2; if the number of information bits in DCI format 1-2 before padding is less than the payload size of DCI format 0-2 for scheduling the same service cell, pad zeros in DCI format 1-2 until the payload size of DCI format 1-2 is equal to that of DCI format 0-2.

5. If the number of information bits in DCI format 0-1 before padding is less than the payload size of DC format 1-1 for scheduling the same service cell, pad zeros in DCI format 0-1 until the payload size of DCI format 0-1 is equal to that of DCI format 1-1; if the number of information bits in DCI format 1-1 before padding is less than the payload size of DCI format 0-1 for scheduling the same serving cell, pad zeros in DCI format 1-1 until the payload size of DCI format 1-1 is equal to that of DCI format 0-1.

6. The UE determines that the payload size of DCI format 1-3 is equal to that of DCI format 1-0 in CSS according to the protocol or high-layer signaling.

7. Make the payload size of DCI format 1-0 of USS the same as that of DCI format 1-3 by increasing the number of bits of DCI format 1-0 of USS.

8. Make the payload size of DCI format 1-0 of USS the same as that of DCI format 1-3 by decreasing the number of bits of DCI format 1-0 of USS.

9. Make the payload size of DCI format 1-2 of USS the same as that of DCI format 1-3 by increasing the number of bits of DCI format 1-2 of USS.

10. Make the payload size of DCI format 1-2 of USS the same as that of DCI format 1-3 by decreasing the number of bits of DCI format 1-2 of USS.

11. Make the payload size of DCI format 1-1 of USS the same as that of DCI format 1-3 by increasing the number of bits of DCI format 1-1 of USS.

12. Make the payload size of DCI format 1-1 of USS the same as that of DCI format 1-3 by decreasing the number of bits of DCI format 1-1 of USS.

13. Make the payload size of DCI format 0-2 of USS the same as that of DCI format 1-3 by increasing the number of bits of DCI format 0-2 of USS.

14. Make the payload size of DCI format 0-2 of USS the same as that of DCI format 1-3 by decreasing the number of bits of DCI format 0-2 of USS.

15. Make the payload size of DCI format 0-1 of USS the same as that of DCI format 1-3 by increasing the number of bits of DCI format 0-1 of USS.

16. Make the payload size of DCI format 0-1 of USS the same as that of DCI format 1-3 by decreasing the number of bits of DCI format 0-1 of USS.

17. Make the payload size of DCI format 1-1 of USS the same as that of DCI format 1-3 by increasing the number of bits of payload size in USS that has been aligned with the DCI format 0-1 payload size and DCI format 1-1 (the payload size of DCI format 1-1 has been the same as that of DCI format 0-1).

18. Make the payload size of DCI format 1-1 of USS the same as that of DCI format 1-3 by reducing the number of bits of payload size in USS that has been aligned with the payload size of DCI format 0-1 and DCI format 1-1 (the payload size of DCI format 1-1 has been the same as that of DCI format 0-1).

19. Make the payload size of DCI format 1-2 of USS the same as that of DCI format 1-3 by increasing the number of bits of payload size in USS that has been aligned with the DCI format 0-2 payload size and DC format 1-2 (the payload size of DCI format 1-2 has been the same as that of DCI format 0-2).

20. Make the payload size of DCI format 1-2 of USS the same as that of DCI format 1-3 by reducing the number of bits of payload size in USS that has been aligned with the payload size of DCI format 0-2 and DCI format 1-2 (the payload size of DCI format 1-2 has been the same as that of DC format 0-2).

21. Make the payload size of DCI format 1-0 of USS the same as that of DCI format 1-3 by increasing or decreasing the number of bits of DCI format 1-0 of USS.

22. Make the payload size of DCI format 1-2 of USS the same as that of DCI format 1-3 by increasing or decreasing the number of bits of DCI format 1-2 of USS.

23. Make the payload size of DCI format 1-1 of USS the same as that of DCI format 1-3 by increasing or decreasing the number of bits of DCI format 1-1 of USS.

24. Make the payload size of DCI format 0-2 of USS the same as that of DCI format 1-3 by increasing or decreasing the number of bits of DCI format 0-2 of USS.

25. Make the payload size of DCI format 0-1 of USS the same as that of DCI format 1-3 by increasing or decreasing the number of bits of DCI format 0-1 of USS.

26. Make the payload size of DCI format 1-1 of USS the same as that of DCI format 1-3 by increasing or reducing the number of bits of payload size in USS that has been aligned with the payload size of DCI format 0-1 and DCI format 1-1 (the payload size of DCI format 1-1 has been the same as that of DCI format 0-1).

27. Make the payload size of DCI format 1-2 of USS the same as that of DCI format 1-3 by increasing or reducing the number of bits of payload size in USS that has been aligned with the payload size of DCI format 0-2 and DCI format 1-2 (the payload size of DCI format 1-2 has been the same as that of DCI format 0-2).

For DCI format 1-3, one or more of DCI format payload size Alignment Methods 3 to 27, above, can be selected based on rules determined via the protocol or higher-layer signaling (these rules will be described in detail with specific embodiments below). Specifically, according to the correspondence relationship between the number of information bits of DCI format 1-3 (i.e., the payload size of DCI format 1-3) and the payload sizes of other DCI formats (i.e., the size relationship between payload sizes), one or more of the DCI format payload size Alignment Methods 3 to 27, above, are selected in a certain order until the number of DCI formats with different payloads detected by a UE in each serving cell is less than or equal to 4, and the number of DCI formats with different payloads detected by the UE is less than 4.

Next, specific embodiments in case of the introduction of DCI format 1-3 and/or DCI format 1-4 will be described in combination with one or more of the above 27 DCI format payload size alignment methods.

According to an embodiment, if a UE is configured to detect DCI format 1-3, the UE determines that the payload size of DCI format 1-3 is equal to that of DCI format 1-0 in a CSS according to a protocol or high-layer signaling. Then, each of the following DCI format payload size alignment methods are performed one by one numbered from small to large, until the number of DCI formats with different payloads detected by the UE in each serving cell is less than or equal to 4, and the number of DCI formats with different payload scrambled by C-RNTI detected by the UE in each serving cell is less than or equal to 3:

3. Make the payload size of DCI format 1-0 of USS the same as that of DCI format 1-0 of CSS by increasing or decreasing the number of bits of DCI format 1-0 of USS.

4. If the number of information bits in DCI format 0-2 before padding is less than the payload size of DCI format 1-2 for scheduling the same service cell, pad zeros in DCI format 0-2 until the payload size of DCI format 0-2 is equal to that of DC format 1-2; if the number of information bits in DCI format 1-2 before padding is less than the payload size of DCI format 0-2 for scheduling the same service cell, pad zeros in DCI format 1-2 until the payload size of DCI format 1-2 is equal to that of DCI format 0-2.

5. If the number of information bits in DCI format 0-1 before padding is less than the payload size of DCI format 1-1 for scheduling the same service cell, pad zeros in DCI format 0-1 until the payload size of DCI format 0-1 is equal to that of DCI format 1-1; if the number of information bits in DCI format 1-1 before padding is less than the payload size of DCI format 0-1 for scheduling the same serving cell, pad zeros in DCI format 1-1 until the payload size of DCI format 1-1 is equal to that of DCI format 0-1.

According to an embodiment, if a UE is configured to detect DCI format 1-3, the UE determines at least one DCI format payload size alignment method from DCI format payload size Alignment Methods 3 to 27 according to a protocol or high-layer signaling, and if the UE determines more than one DCI format payload size alignment method from the 25 DCI format payload size alignment methods, the UE determines the execution order of the more than one DCI format payload size alignment methods according to the protocol or high-layer signaling until the number of DCI formats with different payloads detected by the UE in each serving cell is less than or equal to 4, and the number of DCI formats with different payloads scrambled by C-RNTI detected by the UE in each serving cell is less than or equal to 3. For example, if the UE determines that the DCI format payload size alignment methods are 3, 4, 5 and 22 according to the protocol or high-layer signaling, the UE determines that the execution order of the DCI format payload size alignment methods according to the protocol or high-layer signaling may be 3→4→22→5.

According to an embodiment, if a UE is configured to detect DCI format 1-3, the UE determines at least two DCI format payload size alignment methods from DCI format payload size Alignment Methods 3 to 27 according to a protocol, and then the UE determines at least one DCI format payload size alignment method from the at least two DCI format payload size alignment methods among DCI format payload size Alignment Methods 3 to 27 according to high-layer signaling. For example, the UE determines that the DCI format payload size Alignment Methods are 26 and 27 according to the protocol, and the UE determines that the DCI format payload size alignment method is 26 according to the high-layer signaling. With this method, a base station can flexibly determine the appropriate DC format payload size alignment method(s) according to the correspondence relationship between the number of information bits of DCI format 1-3 and payload sizes of other DCI formats.

According to an embodiment, if a UE is configured to detect DCI format 1-3, and after the UE has performed the DCI format payload size Alignment Methods 3, 4 and 5, the requirements that the number of DCI formats with different payload detected by the UE in each serving cell is less than or equal to 4 and the number of DCI formats with different payload scrambled by the C-RNTI detected by the UE in each serving cell is less than or equal to 3 have not been met, then according to the predetermined rules, one of DCI format payload size Alignment Methods 26 and 27 for DCI format payload size alignment is determined to be selected, such that the number of DCI formats with different payloads detected by the UE in each serving cell is less than or equal to 4, and the number of DCI formats with different payloads scrambled by C-RNTI detected by the UE in each serving cell is less than or equal to 3.

Specifically, the above predetermined rules can be set as follows:

Rule 1: One of the DCI format payload size Alignment Methods 26 and 27 is selected for DCI format payload size alignment, according to the size comparison between a difference L1, which is the difference between the payload size A of DCI format 0-1 payload size aligned with DCI format 1-1 and payload size B of DCI format 1-3 (L1=the absolute value of (A−B)), and a difference L2, which is the difference between the payload size C of DCI format 0-2 payload size aligned with DCI format 1-2 and payload size D of DCI format 1-3 (L2=the absolute value of (C−D)). That is, if L1 is less than or equal to L2, the DCI format payload size Alignment Method 26 is selected for DCI format payload size alignment; and if L1 is larger than L2, the DCI format payload size Alignment Method 27 is selected for DCI format payload size alignment.

By employing this method, on the premise that the number of DCI formats with different payload detected by the UE in each serving cell does not exceed the limit, the increased or decreased number of bits of DC formats during the alignment of the DCI formats can be reduced, thereby reducing the influence on the performance of DCI formats.

Rule 2: One of the DCI format payload size Alignment Methods 26 and 27 is selected for DCI format payload size alignment, according to the size comparison between a difference P1, which is the difference between the payload size A of DCI format 0-1 payload size aligned with DCI format 1-1 and payload size B of DCI format 1-3 (P1=(A−B)), and a difference P2, which is the difference between the payload size C of DCI format 0-2 payload size aligned with DCI format 1-2 and payload size D of DCI format 1-3 (P2=(C−D)). That is, if P1 is less than or equal to P2, the DCI format payload size Alignment Method 26 is selected for DCI format payload size alignment; and if P1 is larger than P2, the DCI format payload size Alignment Method 27 is selected for DCI format payload size alignment.

With this method, on the premise that the number of DCI formats with different payloads detected by the UE in each serving cell does not exceed the limit, DCI format alignment method(s) to increase the DCI format payload size are employed as much as possible, and DCI format alignment method(s) to reduce the DCI format payload size are avoided, thereby reducing the flexibility of DCI format scheduling.

According to an embodiment, if a UE is configured to detect DCI format 1-3, and the requirements that the number of DCI formats with different payloads detected by the UE in each serving cell is less than or equal to 4, and the number of DCI formats with different payloads scrambled by C-RNTI detected by the UE in each serving cell is less than or equal to 3, have not been met, the UE determines at least two DCI format payload size alignment methods from payload size Alignment Methods 3 to 27 according to the protocol or high-layer signaling, and then determines at least one DCI format payload size alignment method from DCI format payload size Alignment Methods 3 to 27 according to a protocol or high-layer signaling. For example, the UE determines the DCI format payload size alignment methods as 22 and 23 according to the protocol, and then selects one of the DCI format payload size Alignment Methods 22 and 23 according to predetermined rules for DCI format payload size alignment, such that the number of DCI formats with different payloads detected by the UE in each serving cell is less than or equal to 4, and the number of DCI formats with different payload scrambled by C-RNTI detected by the UE in each serving cell is less than or equal to 3.

Specifically, the above predetermined rules can be set as follows:

Rule 1: One of the DCI format payload size Alignment Methods 22 and 23 is selected for DCI format payload size alignment, according to the size comparison between a difference L1, which is the difference between the DCI format 0-1 payload size A and DCI format 1-3 payload size B (L1=the absolute value of (A−B)), and a difference L2, which is the difference between the DCI format 1-1 payload size C and DCI format 1-3 payload size D (L2=the absolute value of (C−D)). That is, if L1 is less than or equal to L2, the DCI format payload size Alignment Method 22 is selected for DCI format payload size alignment; if L1 is larger than L2, the DCI format payload size Alignment Method 23 is selected for DCI format payload size alignment.

By employing this method, on the premise that the number of DCI formats with different payloads detected by the UE in each serving cell does not exceed the limit, the increased or decreased number of bits of DCI formats during the alignment of the DCI formats can be reduced, thereby reducing the influence on the performance of DCI formats.

Alternatively, one of the DCI format payload size Alignment Methods 24 and 25 is selected for DCI format payload size alignment, according to the size comparison between a difference L1, which is the difference between the DCI format 0-2 payload size A and the payload size B of DCI format 1-3 (L1=the absolute value of (A−B)), and a difference L2, which is the difference between the DCI format 1-2 payload size C and payload size D of DCI format 1-3 (L2=the absolute value of (C−D)). That is, if L1 is less than or equal to L2, the DCI format payload size Alignment Method 24 is selected for DCI format payload size alignment; if L1 is larger than L2, the DCI format payload size Alignment Method 25 is selected for DCI format payload size alignment.

By employing this method, on the premise that the number of DCI formats with different payloads detected by the UE in each serving cell does not exceed the limit, the increased or decreased number of bits of DCI formats during the alignment of the DCI formats can be reduced, thereby reducing the influence on the performance of DCI formats.

Rule 2: One of the DCI format payload size Alignment Methods 22 and 23 is selected for DCI format payload size alignment, according to the size comparison between a difference P1, which is the difference between the DCI format 0-1 payload size A and DCI format 1-3 payload size B (P1=(A−B)), and a difference P2, which is the difference between the DCI format 1-1 payload size C and DCI format 1-3 payload size D (P2=(C−D)). That is, if P1 is less than or equal to P2, the DCI format payload size Alignment Method 22 is selected for DCI format payload size alignment; and if P1 is larger than P2, the DCI format payload size Alignment Method 23 is selected for DCI format payload size alignment.

Alternatively, one of the DCI format payload size Alignment Methods 24 and 25 is selected for DCI format payload size alignment, according to the size comparison between a difference P1, which is the difference between the DCI format 0-2 payload size A and the payload size B of DCI format 1-3 (P1=(A−B)), and a difference P2, which is the difference between the DCI format 1-2 payload size C and payload size D of DCI format 1-3 (P2=(C−D)). That is, if P1 is less than or equal to P2, the DCI format payload size Alignment Method 24 is selected for DCI format payload size alignment; and if P1 is larger than P2, the DCI format payload size Alignment Method 25 is selected for DCI format payload size alignment.

With this method, on the premise that the number of DCI formats with different payloads detected by the UE in each serving cell does not exceed the limit, DCI format alignment methods for increasing the DCI format payload size are employed as much as possible, and DCI format alignment methods for reducing the DCI format payload size are avoided, thereby reducing the flexibility of DCI format scheduling.

The above DCI format payload size alignment methods can also be applied to DCI format 1-4, in which DCI format 1-4 replaces DCI format 1-3, and different DCI format payload size alignment methods are employed for DCI formats 1-4 and 1-3 through a protocol or high-layer signaling. For example, DCI format payload size Alignment Method 6 is employed for DCI format 1-3, while DCI format payload size alignment method in embodiments described above is employed for DCI format 1-4.

The number of DCI formats with different payloads detected by a UE in each serving cell not exceeding the limit described above is performed in units of each serving cell, and the number of DCI formats with different payloads detected by the UE in each serving cell not exceeding the limit can also be performed in one time unit in each serving cell, in units of slot or monitoring occasion (MO). For example, in time unit 1, DCI formats with different payloads detected by the UE in serving cell 1 are DCI format 1-0, DCI format 1-1 and DCI format 1-2, which meet the requirement that the number of DCI formats with different payloads scrambled by C-RNTI detected by the UE in each serving cell is less than or equal to 3; in time unit 2, the DCI formats with different payloads detected by the UE in serving cell 1 are DCI format 1-0, DCI format 1-1 and DCI format 1-3, which also meet the requirement that the number of DCI formats with different payloads scrambled by C-RNTI detected by a UE in each serving cell is less than or equal to 3, but the DCI formats with different payloads detected by the UE in serving cell 1 are DCI formats 1-0, DCI format 1-1, DCI format 1-2 and DCI format 1-3, which does not meet the requirement that the number of DCI formats with different payloads scrambled by C-RNTI detected by a UE in each serving cell is less than or equal to 3. With the number of DCI formats with different payloads detected by a UE in each serving cell not exceeding the limit being performed in units of one time unit in each serving cell, the influence of DCI format alignment can be reduced.

According to an embodiment, HARQ-ACK of one type (this type can be called a second type). The second type may be a multicast type, that is, one same PDSCH can be received by more than one UE, or the PDSCH is scheduled by DCI scrambled by a group public RNTI CRC that includes the HARQ-ACK information of a second type of activating semi-persistent (SPS) PDSCH (that is, SPS PDSCH scheduled by DCI), the HARQ-ACK information of a second type of SPS PDSCH releasing DCI, the HARQ-ACK information of a second type of activated SPS PDSCH (SPS PDSCH not scheduled by DCI), and the HARQ-ACK information of a second type of dynamically scheduled PDSCH.

In order to save the PUCCH resources for the UE to transmit HARQ-ACK information and reduce the power consumption of the UE for transmitting HARQ-ACK information, the UE may determine an enabling state of HARQ-ACK information transmission (the enabling state of HARQ-ACK information transmission includes two states of enabled and disabled) by receiving an information indication transmitted by a base station (the information indication may include high-layer signaling configuration, media access layer signaling or physical layer signaling (DCI)) or pre-configuration. When the enabling state of HARQ-ACK information transmission for the UE is enabled, the UE performs HARQ-ACK information transmission; when the enabling state of HARQ-ACK information transmission for the UE is disabled, the UE does not perform HARQ-ACK information transmission.

Figure 6:
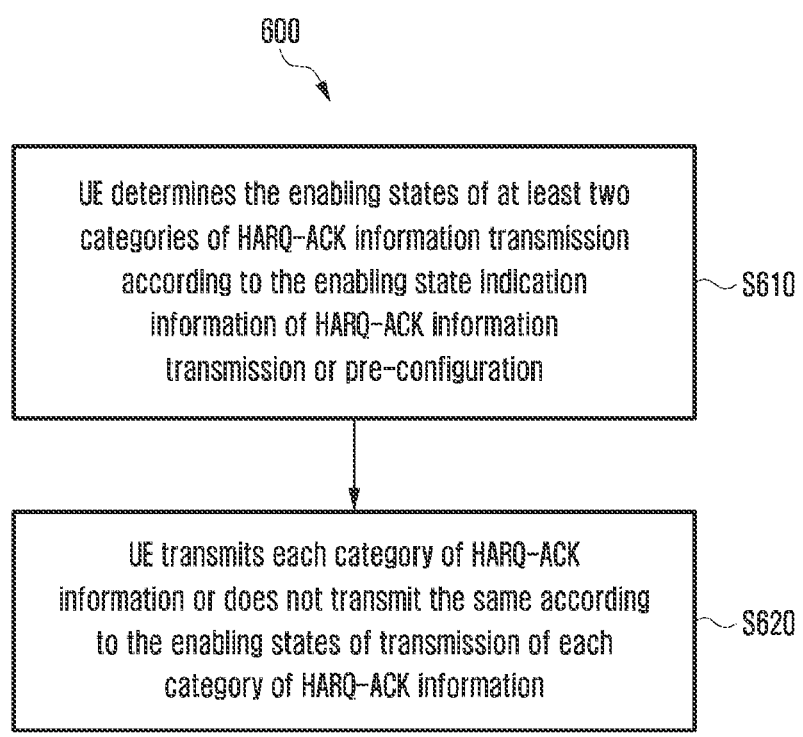
FIG. 6 illustrates a flowchart showing steps for transmitting hybrid automatic repeat request (HARQ)-acknowledgement (ACK) information, according to an embodiment of the disclosure.

FIG. 6 illustrates a flowchart showing steps for transmitting HARQ-ACK information, according to an embodiment of the disclosure.

As shown in FIG. 6, in step S610, the UE determines the enabling states of at least two categories of HARQ-ACK information transmission according to the enabling state indication information of HARQ-ACK information transmission or pre-configuration. In step S620, the UE transmits each category of HARQ-ACK information or does not transmit each category of HARQ-ACK information according to the enabling state of transmission of each category of HARQ-ACK information.

The HARQ-ACK information can be classified by the second type for activating SPS PDSCH, the HARQ-ACK information of the second type for SPS PDSCH releasing DCI, the HARQ-ACK information of the second type for activated SPS PDSCH and the HARQ-ACK information of the second type for dynamically scheduled PDSCH. The HARQ-ACK information can be classified into at least two categories, for example, an optional HARQ-ACK information classification method is that the HARQ-ACK information of the second type for activating SPS PDSCH and the HARQ-ACK information of the second type for SPS PDSCH releasing DCI are the first category of HARQ-ACK information, and the HARQ-ACK information of the second type for activated SPS PDSCH and the HARQ-ACK information of the second type for dynamically scheduled PDSCH are the second category of HARQ-ACK information.

The enabling states of the first category of HARQ-ACK information transmission can be determined to be enabled for the enabling state of the HARQ-ACK information transmission by pre-configuration, and the enabling states of the second category of HARQ-ACK information transmission can be determined by a UE through receiving the information indication transmitted by a base station (the information indication can include high-layer signaling configuration, media access layer signaling or physical layer signaling (DCI)). The advantage of this method is to ensure that the UE can reliably receive the HARQ-ACK information of the second type for activating SPS PDSCH and the HARQ-ACK information of the second type for SPS PDCH releasing DCI, and save the PUCCH transmission resources for the HARQ-ACK information of the activated SPS PDCH and the HARQ-ACK information of the second type of dynamically scheduled PDCH at the same time.

The enabling states of the first category of HARQ-ACK information transmission can be determined by the UE through receiving the first information indication transmitted by a base station (the information indication can include high-layer signaling configuration, media access layer signaling or physical layer signaling (DCI)), and the enabling states of the second category of HARQ-ACK information transmission can be determined by the UE through receiving the second information indication transmitted by the base station (the information indication can include high-layer signaling configuration, media access layer signaling or physical layer signaling (DCI)). The advantage of this method is that while ensuring that UE can reliably receive the second type of activating SPS PDCH and the second type of SPS PDCH releasing DCI, the PUCCH transmission resources for transmitting HARQ-ACK information are used efficiently (e.g., the total number of PUCCH transmission resources that are used may be reduced). Wherein the first information indication and the second information indication are independent information indications.

Figure 7:
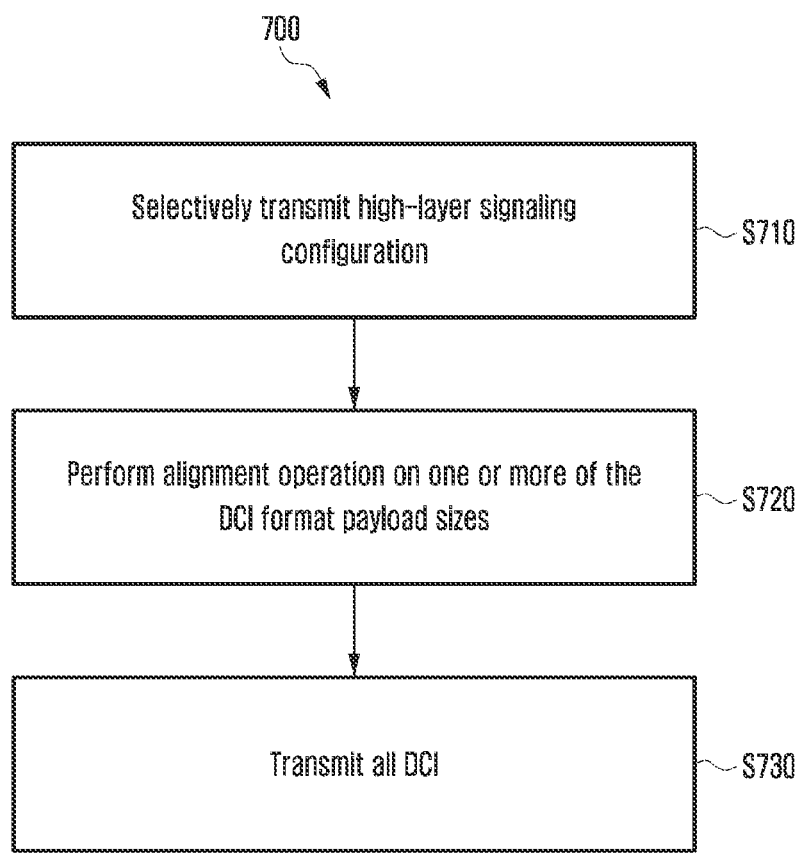
FIG. 7 illustrates a flowchart showing steps for transmitting DCI, according to an embodiment of the disclosure.
Figure 8:
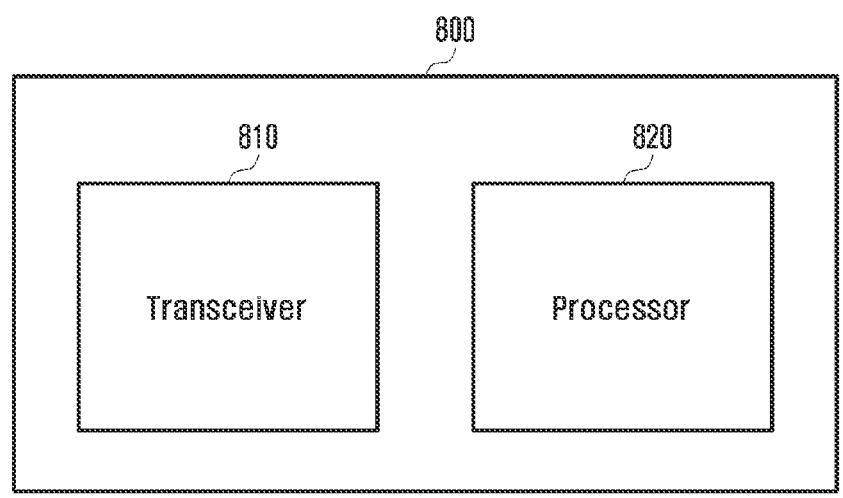
FIG. 8 illustrates a block diagram of a base station, according to an embodiment of the disclosure.

FIG. 7 illustrates a flowchart showing steps for transmitting DCI, according to an embodiment of the disclosure. FIG. 8 illustrates a block diagram of a base station, according to an embodiment of the disclosure. The processor 820 shown in FIG. 8 can perform the method 700 described below in connection with FIG. 7.

Referring to FIG. 7, in step S710, the base station selectively transmits high-layer signaling configuration to the user equipment (UE), the high-layer signaling configuration indicates the formats of all DCI to be received by the UE and the DCI format payload sizes corresponding to the formats of DCI. In particular, the UE can directly determine the formats of all DCI to be received and the DCI format payload sizes corresponding to the formats of DCI through a protocol. In such a case the base station may not transmit the high-layer signaling configuration to the UE. In step S720, the base station performs an alignment operation on one or more of the DCI format payload sizes. In step S730, the base station transmits all DCI.

Referring to FIG. 8, a base station 800 includes a transceiver 810 and a processor 820. The processor 820 may be configured to execute instructions to cause the base station 800 to perform some or all of the embodiments of the disclosure. In addition, a UE may similarly be configured and include a transceiver and a processor to perform some or all of the embodiments of the disclosure.

With reference to the drawings, the description set forth herein describes example configurations, methods and devices, and does not represent all examples that can be implemented or are within the scope of the claims. As used herein, the term "example" means "serving as an example, instance or illustration", rather than "preferred" or "superior to other examples". The detailed description includes specific details in order to provide an understanding of the described technology. However, these techniques may be practiced without these specific details. In some cases, well-known structures and devices are shown in block diagram form to avoid obscuring the concepts of the described examples.

Although this specification contains a number of specific implementation details, these should not be interpreted as limitations on the scope of the claims, but rather as descriptions of specific features of specific embodiments. Certain features described in this specification in the context of separate embodiments may also be implemented in combination in a single embodiment. On the contrary, various features described in the context of a single embodiment can also be implemented separately in multiple embodiments or in any suitable sub-combination. Furthermore, although features may be described above as functioning in certain combinations and even initially claimed as such, in some cases, one or more features from a claimed combination may be deleted from the combination, and the claimed combination may be directed to sub-combinations or variations of sub-combinations.

It should be understood that the particular order or hierarchy of steps in the method is illustrative of an exemplary process. Based on design preference, it can be understood that the specific order or level of steps in the method can be rearranged to achieve the functions and effects disclosed in the present disclosure. The appended method claims present the elements of the various steps in the order of example, and are not meant to be limited to the particular order or hierarchy presented unless specifically stated otherwise. Furthermore, although elements may be described or claimed in the singular form, the plural is also contemplated unless the limitation to the singular is explicitly stated. Therefore, the present disclosure is not limited to the illustrated example, and any means for performing the functions described herein are included in various aspects of the present disclosure.

While the present disclosure has been particularly shown and described with reference to certain embodiments thereof, it will be understood by those of ordinary skill in the art that various changes in form and details may be made therein without departing from the spirit and scope of the disclosure as defined by the appended claims and their equivalents.

What is claimed is:

1. A method performed by a user equipment (UE), the method comprising:
   determining formats of all downlink control information (DCI) to be received and DCI format payload sizes corresponding to the formats of all DCI;
   performing alignment operations on the DCI format payload sizes according to an execution order; and
   receiving the all DCI,
   wherein, the formats of all DCI to be received include a DCI format for a multicast physical downlink shared channel (PDSCH).

2. The method of claim 1, wherein determining the formats of all DCI to be received and the DCI format payload sizes corresponding to the formats of all DCI comprises:
   determining the DCI format payload sizes according to the higher-layer signaling.

3. The method of claim 1, wherein performing the alignment operations on the DCI format payload sizes comprises:
   determining at least one of a plurality of DCI format payload size alignment operations and the execution order of the plurality of DCI format payload size alignment operations.

4. The method of claim 1, wherein performing the alignment operations on the DCI format payload sizes comprises:
   making a payload size of the DCI format for the multicast PDSCH equal to a payload size of a DCI format 1-0 in a common search space (CSS).

5. The method of claim 1, wherein performing the alignment operations on the DCI format payload sizes comprises:
   making a payload size of a DCI format of a UE-specific search space (USS) equal to a payload size of the DCI format for the multicast PDSCH by increasing or decreasing a number of bits of the DCI format of the USS,
   wherein, the DCI format of the USS includes at least one of a DCI format 1-0, a DCI format 1-2, a DCI format 1-1, a DCI format 0-2 and a DCI format 0-1.

6. The method of claim 5, wherein performing the alignment operations on the DCI format payload sizes further comprises:
   after a payload size of a DCI format 0-x is aligned with a payload size of a DCI format 1-x, making the payload size of the DCI format 1-x of the USS equal to the payload size of the DCI format for the multicast PDSCH by increasing or decreasing a number of bits of the payload size of the DCI format 0-x and DCI format 1-x in the USS,
   wherein, x is 1 or 2.

7. A user equipment (UE), comprising:
a transceiver; and
a processor configured to:
  determine formats of all downlink control information (DCI) to be received and DCI format payload sizes corresponding to the formats of all DCI;
  perform alignment operations on the DCI format payload sizes according to an execution order; and
  receive the all DCI,
  wherein, the formats of all DCI to be received include a DCI format for a multicast physical downlink shared channel (PDSCH).

8. The UE of claim 7, wherein, for determining the formats of all DCI to be received and the DCI format payload sizes corresponding to the formats of all DCI, the processor is configured to:
  determine the DCI format payload sizes according to higher-layer signaling.

9. The UE of claim 7, wherein, for performing the alignment operations on the DCI format payload sizes, the processor is configured to:
  determine at least one of a plurality of DCI format payload size alignment operations and the execution order of the plurality of DCI format payload size alignment operations.

10. The UE of claim 7, wherein the processor is configured to:
  make a payload size of the DCI format for the multicast PDSCH equal to a payload size of a DCI format 1-0 in a common search space (CSS).

11. The UE of claim 7, wherein the processor is configured to:
  make a payload size of a DCI format of a UE-specific search space (USS) equal to a payload size of the DCI format for the multicast PDSCH by increasing or decreasing a number of bits of the DCI format of the USS,
  wherein, the DCI format of the USS includes at least one of a DCI format 1-0, a DCI format 1-2, a DCI format 1-1, a DCI format 0-2 and a DCI format 0-1.

12. The UE of claim 11, wherein the processor is configured to:
  after a payload size of a DCI format 0-x is aligned with a payload size of a DCI format 1-x, make the payload size of the DCI format 1-x of the USS equal to the payload size of the DCI format for the multicast PDSCH by increasing or decreasing a number of bits of the payload size of the DCI format 1-x in the USS,
  wherein, x is 1 or 2.

13. A method performed by a base station, the method comprising:
  selectively transmitting a higher-layer signaling configuration to a user equipment (UE), wherein the higher-layer signaling configuration indicates formats of all downlink control information (DCI) to be transmitted and DCI format payload sizes corresponding to the formats of all DCI;
  performing alignment operations on the DCI format payload sizes according to an execution order; and
  transmitting the all DCI,
  wherein, the formats of all the DCI to be transmitted include a DCI format for a multicast physical downlink shared channel (PDSCH).

14. The method of claim 13, wherein performing the alignment operations on the DCI format payload sizes comprises:
  determining at least one of a plurality of DCI format payload size alignment operations and the execution order of the plurality of DCI format payload size alignment operations.

15. The method of claim 13, wherein performing the alignment operations on the DCI format payload sizes comprises:
  making a payload size of the DCI format for the multicast PDSCH equal to a payload size of a DCI format 1-0 in a common search space (CSS).

16. The method of claim 13, wherein performing the alignment operations on the DCI format payload sizes comprises:
  making a payload size of a DCI format of a UE-specific search space (USS) equal to a payload size of the DCI format for the multicast PDSCH by increasing or decreasing a number of bits of the DCI format of the USS,
  wherein, the DCI format of the USS includes at least one of a DCI format 1-0, a DCI format 1-2, a DCI format 1-1, a DCI format 0-2 and a DCI format 0-1.

17. A base station, comprising:
a transceiver; and
a processor configured to:
  selectively transmit a higher-layer signaling configuration to a user equipment (UE), wherein the higher-layer signaling configuration indicates formats of all downlink control information (DCI) to be transmitted and DCI format payload sizes corresponding to the formats of all DCI;
  perform alignment operations on the DCI format payload sizes according to an execution order; and
  transmit the all DCI,
  wherein, the formats of all the DCI to be transmitted include a DCI format for a multicast physical downlink shared channel (PDSCH).

18. The base station of claim 17, wherein for performing the alignment operations on the DCI format payload sizes, the processor is configured to:
  determine at least one of a plurality of DCI format payload size alignment operations and the execution order of the plurality of DCI format payload size alignment operations.

19. The base station of claim 17, wherein the processor is further configured to:
  make a payload size of the DCI format for the multicast PDSCH equal to a payload size of a DCI format 1-0 in a common search space (CSS).

20. The base station of claim 17, wherein the processor is further configured to:
  make a payload size of a DCI format of a UE-specific search space (USS) equal to a payload size of the DCI format for the multicast PDSCH by increasing or decreasing a number of bits of the DCI format of the USS,
  wherein, the DCI format of the USS includes at least one of a DCI format 1-0, a DCI format 1-2, a DCI format 1-1, a DCI format 0-2 and a DCI format 0-1.

* * * * *